United States Patent [19]
Oh

[11] Patent Number: 5,479,556
[45] Date of Patent: Dec. 26, 1995

[54] ROTATION CONTROL APPARATUS EMPLOYING A COMB FILTER AND PHASE ERROR DETECTOR

[75] Inventor: Young G. Oh, Seoul, Rep. of Korea

[73] Assignee: Goldstar Co., Ltd., Seoul, Rep. of Korea

[21] Appl. No.: 263,189

[22] Filed: Jun. 21, 1994

[30] Foreign Application Priority Data

Jun. 29, 1993 [KR] Rep. of Korea ................ 11963/1993

[51] Int. Cl.⁶ .................................................. H02P 7/00
[52] U.S. Cl. .................. 388/805; 318/254; 73/862.192
[58] Field of Search ............................ 388/805, 812, 388/813, 820, 909, 842, 844, 814; 318/606–608, 632, 615–618, 59, 61, 254, 132, 439, 599, 798–815, 652, 653, 661, 721, 722; 324/160, 163, 166, 177–179; 73/862, 862.191, 862.326, 862.192

[56] References Cited

U.S. PATENT DOCUMENTS

| | | | |
|---|---|---|---|
| 3,974,428 | 8/1976 | Hafle | 388/811 |
| 4,353,016 | 10/1982 | Born | 318/254 |
| 4,455,513 | 6/1984 | Fulton et al. | 318/138 |
| 4,591,767 | 5/1986 | Koide | 318/599 X |
| 4,740,736 | 4/1988 | Sidman et al. | 318/608 |
| 4,804,894 | 2/1989 | Machida et al. | |
| 4,868,479 | 9/1989 | Byong-Ho et al. | 318/721 |
| 5,113,125 | 5/1992 | Stacey | 318/254 X |
| 5,371,449 | 12/1994 | Tajima et al. | 318/652 X |

*Primary Examiner*—Jonathan Wysocki
*Attorney, Agent, or Firm*—Fliesler, Dubb, Meyer & Lovejoy

[57] ABSTRACT

A rotation control apparatus employing a comb filter to cut off a specified frequency and multiples thereof in response to speed error data detected from a rotation detector. A phase error detector detects a phase error between the rotation detector and an external vertical synchronization pulse. A differentiator converts the output of the filter into angular acceleration error data. The output of the phase error detector is integrated. The two values are scaled and converted to an analog signal which is utilized to drive a motor.

8 Claims, 12 Drawing Sheets

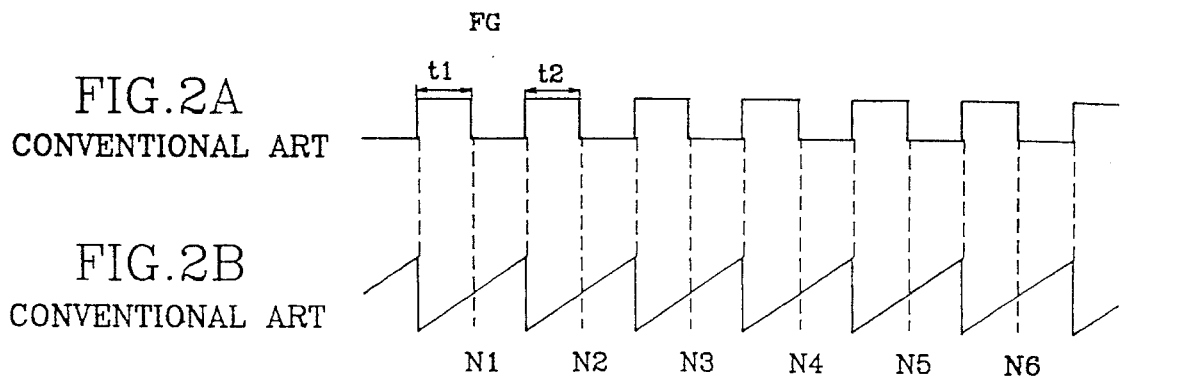
FIG. 2A CONVENTIONAL ART
FIG. 2B CONVENTIONAL ART
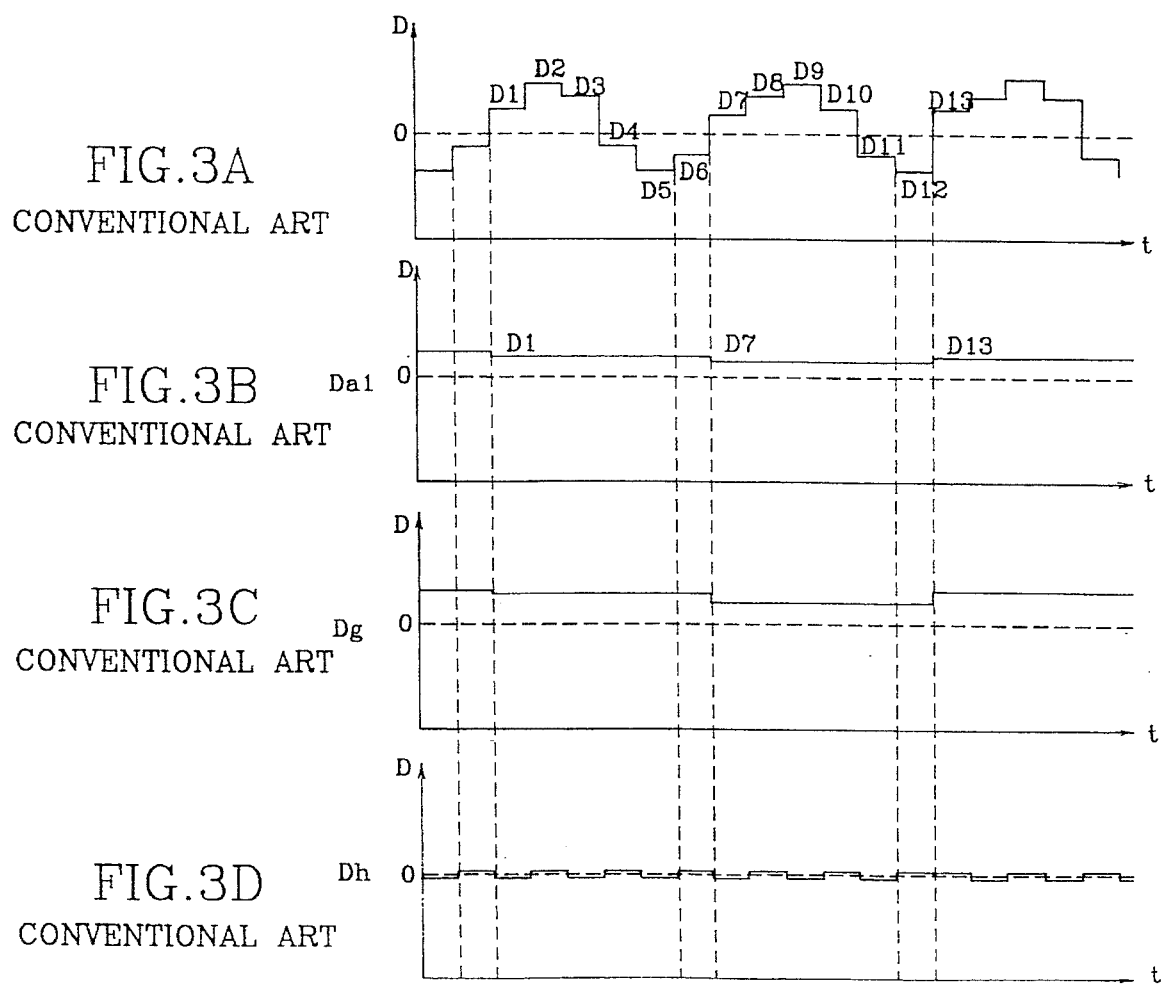
FIG. 3A CONVENTIONAL ART
FIG. 3B CONVENTIONAL ART
FIG. 3C CONVENTIONAL ART
FIG. 3D CONVENTIONAL ART FIG.10A
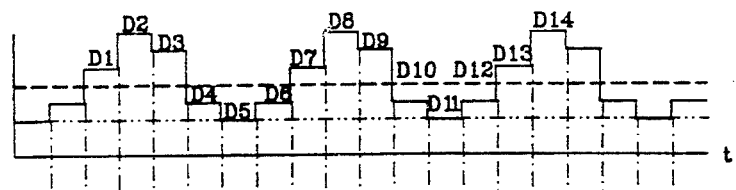
FIG.10B  Da
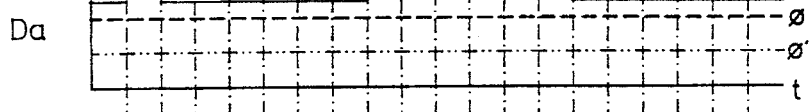
FIG.10C  Db
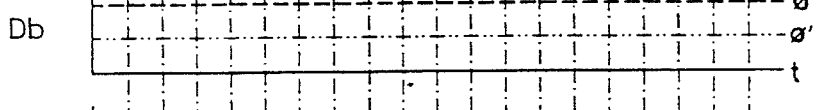
FIG.10D  Dc
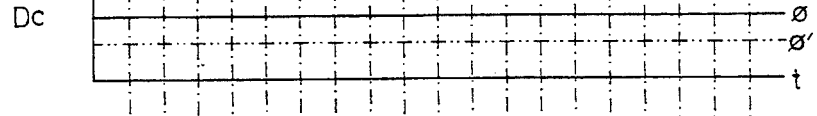
FIG.10E  Dd
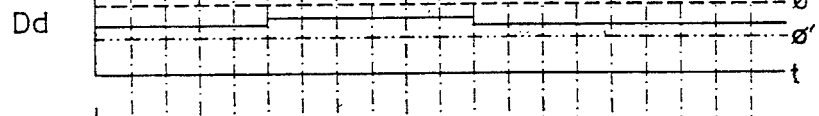
FIG.10F  De
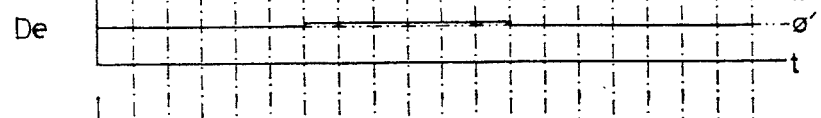
FIG.10G  Df
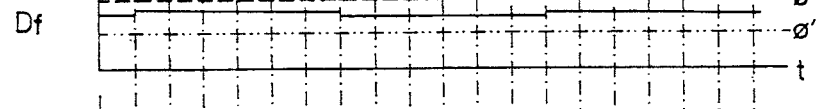
FIG.10H
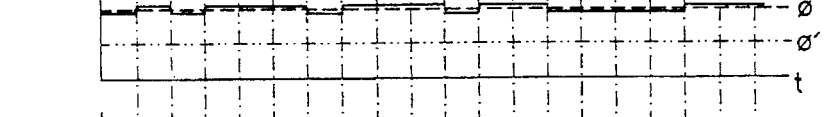
FIG.10I
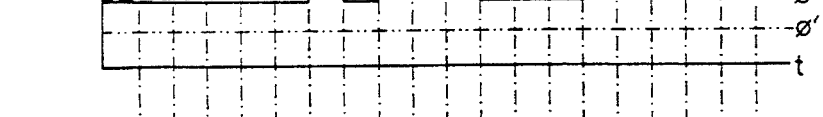
FIG.10J
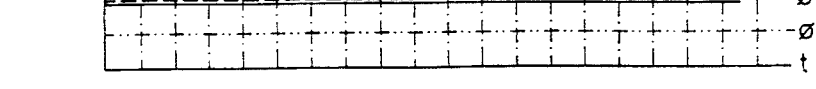

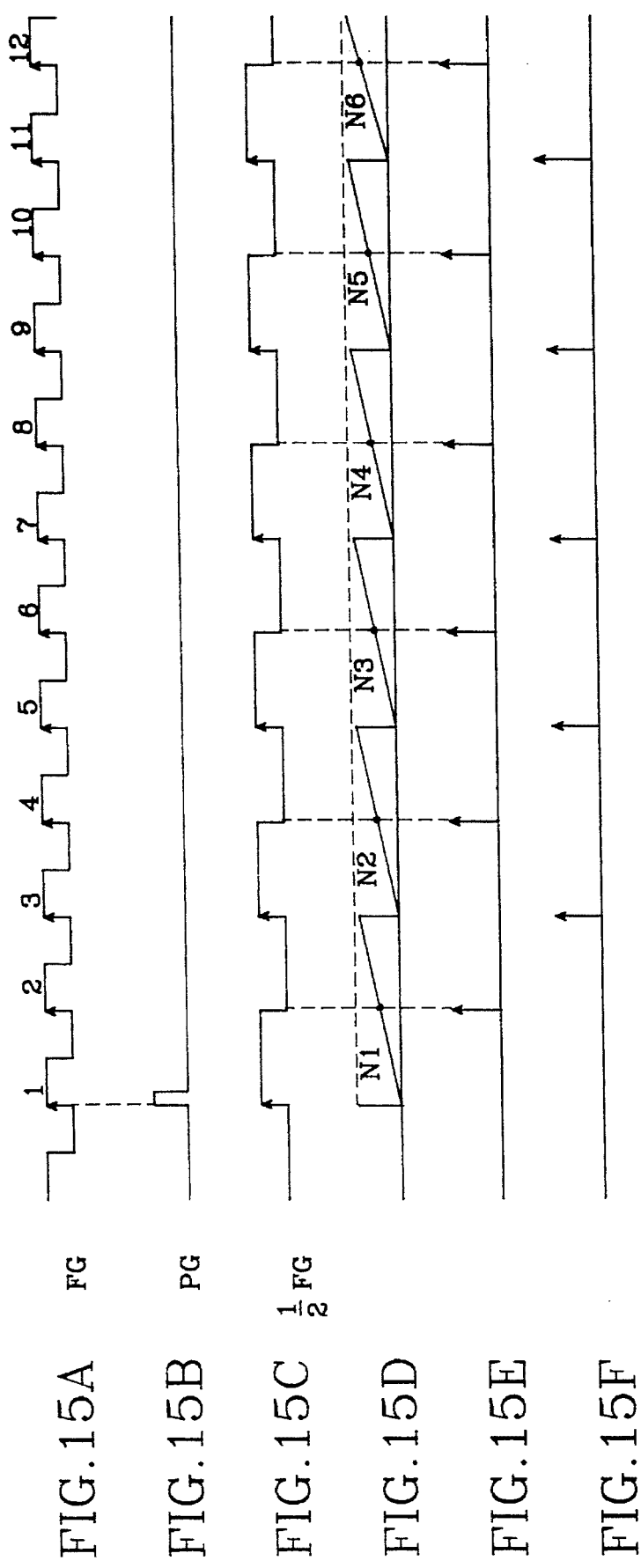

ROTATION CONTROL APPARATUS EMPLOYING A COMB FILTER AND PHASE ERROR DETECTOR

BACKGROUND OF THE INVENTION

1. Field of the Invention

The present invention relates in general to a servo control system for a video cassette recorder (VCR), and more particularly to a comb filter for providing accurate servo control of rotation of a drum motor, a rotation control apparatus employing the comb filter and a method of performing a filtering operation utilizing the comb filter.

2. Description of the Prior Art

Generally, in a drum servo control system for a VCR, it has been proposed to minimize factors such as load and rotation variances of a drum motor, resulting in a distortion which has an important effect on a picture jitter. It is the current practice to perform the servo control system based on a software instead of a hardware to minimize the distortion factors still more.

A comb filter has conventionally been proposed to reduce a polarization error in frequency generation and is disclosed in U.S. Pat. No. 4,804,894, assigned to Sony Corporation, Japan. Herein, this comb filter and a rotation control apparatus using the same will hereinafter be described with reference to FIGS. 1 to 6.

Referring to FIG. 1, there is shown a block diagram of the conventional rotation control apparatus. As shown in this drawing, the conventional rotation control apparatus comprises a rotation sensor 2 polarized with magnetic N/S poles to generate a series of frequency generator (FG) pulses as a drum 1 is rotated. The rotation sensor 2 generates six FG pulses whenever the drum 1 is rotated once.

A rotation detector 3 is adapted to detect the six FG pulses and output the detected six FG pulses to a rotation speed error detection circuit 4. In the rotation speed error detection circuit 4, the six FG pulses from the rotation detector 3 are wave-shaped by a control signal generator 41 mid then applied to a speed error counter 42, which counts a time period from a rising edge to a falling edge of each of the wave-shaped FG pulses under control of the control signal generator 41 and converts the resultant counts into digital data.

FIGS. 2A and 2B are waveform diagrams illustrating a series of FG pulses and counts corresponding thereto respectively, and FIGS. 3A to 3D are waveform diagrams of signals from components in the conventional comb filter, designated by the reference numeral 7 in FIG. 1. The wave-shaped six FG pulses as shown in FIG. 2A are sequentially applied to the speed error counter 42. The speed error counter 42 counts a high level duration t1 of the first FG pulse as shown in FIG. 2A and converts the corresponding count N1 as shown in FIG. 2B into digital data D1 as shown in FIG. 3A. Then, the speed error counters 42 counts a high level duration t2 of the second FG pulse as shown in FIG. 2A and converts the corresponding count N2 as shown in FIG. 2B into digital data D2 as shown in FIG. 3A. In this manner, six digital data D1 to D6 are sequentially produced with respect to the one rotation of the drum 1.

If the counts N1 to N6 of the six FG pulses generated as the drum 1 is rotated once are all the same, namely, N1=N2=N3=N4=N5=N6, no error is present in the rotation detection. However, in the actual case, all of the counts N1 to N6 of the six FG pulses are not the same due to a polarization error of the magnetic N/S poles of the rotation detector 3.

Because a series of six FG pulses are generated as the drum 1 is rotated once, the counts N1 to N6 of the six FG pulses of the first series correspond to counts N7 to N 12 of those of the second series, respectively. Namely, the corresponding counts have the same duty factor in polarization.

In other words, the counts N1 to N6 are the same as the counts N7 to N12, respectively. Therefore, a speed error east be detected with no error in the FG detection by accumulating FG deviations of the respective counts and correcting the FG pulses using the accumulated FG deviations.

A differentiator 5 differentiates the speed error digital data D1 to D6 to convert them into angular acceleration error data. It should be noted that a direct current (DC) component of the speed error digital data D1 to D6 is removed while it is differentiated in the differentiator 5 and the angular acceleration error data have an alternating current (AC) component only with no DC component. The angular acceleration error data from the differentiator 5 are multiplied by a multiplication factor K0 by a multiplier 6 and then fed to an adder 8 through the digital comb filter 7 which reduces the error in the rotation detection.

Also, the speed error digital data D1 to D6 are multiplied by a multiplication factor K1 by a multiplier 9 and then applied to the adder 8.

Then, the output data from the digital comb filter 7 and the output data from the multiplier 9 are added by the adder 8, converted into an analog form by a digital/analog (D/A) converter 10 and applied to a motor driver 11, thereby causing the motor driver 11 to control rotation speed of a motor 12.

Referring to FIG. 4, there is shown a block diagram of the digital comb filter 7 in FIG. 1. As shown in this drawing, the speed error data D1 to D6 as shown in FIG. 3A are fed to low pass filters 73 to 78 through an input terminal 71. The speed error data D 1 to D6 are also applied directly to a subtracter 72 through the input terminal 71.

A switch 79 switches selectively the speed error data D1–D6 generated based on the six FG pulses to apply them to the respective low pass filters 73–78 through corresponding contacts P1–P6. A switch 80 switches selectively outputs of the low pass filters 73-78 to apply them to the subtracter 72.

The low pass filters 73–78 have the same construction. Each of the low pass filters 73–78 includes a subtracter 731 having an input connected to a corresponding one of the contacts P1–P6 and an adder 732 having an input connected to an output of the subtracter 731. Each of the low pass filters 73–78 also includes a limiter 733 for limiting a dynamic range of output data from the adder 732, a delay 734 for delaying output data from the limiter 733 for a time period corresponding to the one rotation of the drum 1, a multiplier 735 for multiplying output data from the delay 734 by a multiplication factor K, and a correction circuit 736 for correcting down a decimal point of output data from the multiplier 735.

The output data Da from the delay 734 as shown in FIG. 3B is fed back to the adder 732 and the output data Dg from the correction circuit 736 as shown in FIG. 3C is fed back to the subtracter 731.

The operation of one (for example, 73) of the low pass filters 73–78 with the above-mentioned constructions will hereinafter be described with reference to FIGS. 3A to 3D.

The subtracter 731 obtains a deviation (D1–Dg1) between the speed error data D1 inputted thereto and the output data Dg1 fed back from the correction circuit 736 thereto. The adder 732 adds the deviation (D1–Dg1 ) obtained by the subtracter 731 to the output data Da1 from the delay 734. The limiter 733 limits the dynamic range of the added data from the adder 732. The delay 734 delays the output data from the limiter 733 for the time period corresponding to the one rotation of the drum 1. As a result, the output data Da1 from the delay 734 represents an average value of the speed error data D1.

The multiplier 735 multiplies the output data Da1 from the delay 734 by the multiplication factor K. The correction circuit 736 corrects down the decimal point of the output data from the multiplier 735. As a result, the correction circuit 736 outputs the data Dg1. The subtracter 72 detects data Dh as shown in FIG. 3D corresponding to a difference between the output at data Dg1 from the correction circuit 736 fed through the switch 80 thereto and the speed error data D1 fed through the input terminal 71 thereto. The operations of the remaining low pass filters 74–78 are substantially the same as that of the low pass filter 73 and details thereof will thus be omitted.

Referring to FIG. 5, there is shown a block diagram illustrating an equivalent circuit of the digital comb filter 7 of FIG. 4 in a digital domain. As shown in this drawing, each of the subtracters 731 and 72 calculates respective differences between the speed error data D1–D6 fed through the input terminal 71 thereto and the output data from the multiplier 735 and applies the resultant data Dh to the adder 732. The output data from the adder 732 is sequentially delayed by six delays $Z^{-1}$, multiplied by the multiplication factor K by the multiplier 735 and then transferred to the subtracters 731 and 72. The data Da delayed by the six delays $Z^{-1}$ is also fed back to the adder 732. As a result, a transfer function T1 of the digital comb filter 7 in FIG. 5 can be obtained by the following equation (1):

$$T1=(1-Z^{-6})/\{1-(1-K)Z^{-6}\} \quad (1)$$

FIG. 6 is a waveform diagram illustrating a frequency characteristic of the transfer function T1 of the digital comb filter 7. In an NTSC system, a frequency characteristic is required to cut off a frequency (30 Hz) corresponding to 30 rotations per sec. and multiples (60 Hz, 90 Hz . . .) thereof. However, the digital comb filter 7 has a disadvantage in that a low frequency gain is reduced in frequency characteristic.

Namely, the data amount is more rapidly accumulated in the delay 734 as K approximates to 1. As a result, a learning time of the digital comb filter 7 is shortened, whereas the low frequency gain thereof is reduced. In order to compensate for such a low frequency gain, K may become smaller. In this case, the learning time of the digital comb filter 7 is lengthened.

Also, in the case where a constant DC bias component is present in the input to the digital comb filter 7, it may be misrecognized as the polarization error by the digital comb filter 7. In this connection, the digital comb filter 7 has the disadvantage that it performs the learning operation to remove the constant DC bias component.

In order to overcome these problems, Sony Corporation does not dispose the digital comb filter 7 between the speed error counter 42 and a common connection point of the differentiator 5 and the multiplier 9 but at the rear of the differentiator 5, which has a high frequency characteristic, as shown in FIG. 1.

However, although the digital comb filter 7 is disposed between the multiplier 6 and the adder 8 as shown in FIG. 1, the speed error data D1–D6 of the FG cycle are fed to the motor driver 11 through the multiplier 9, the adder 8 and the D/A converter 10, resulting in an effect on the motor 12.

Turning again to FIG. 1, a phase control loop includes a pulse generator (PG) detector 13 for detecting a PG pulse corresponding to the one rotation of the drum 1 and a phase error detection circuit 14 for detecting a phase error in response to the detected PG pulse from the PG detector 13 and a vertical synchronous signal Vp of a video signal. The phase error detection circuit 14 is provided with a control signal generator 141 and a phase error counter 142. The phase control loop also includes a multiplier 15 for multiplying the phase error detected by the phase error detection circuit 14 by a multiplication factor K2 and outputting the result to the adder 8, an integrator 17 for integrating the phase error detected by the phase error detection circuit 14, and a multiplier 16 for multiplying an output of the integrator 17 by a multiplication factor K3 and outputting the result to file adder 8. The phase control based on the FG pulses has the effect of reducing the error in the rotation detection. However, this results in a problem in which the digital comb filter 7 with the low frequency gain attenuation characteristic as in the above equation (1) cannot be used in a phase control system for the low frequency control.

SUMMARY OF THE INVENTION

Therefore, the present invention has been made in view of the above problems, and it is an object of the present invention to provide a comb filter having no effect on a low frequency gain even when a learning time thereof is shortened, to enable a high performance of a servo control system.

It is another object of the present invention to provide a rotation control apparatus employing a comb filter which is applicable to a phase control system.

It is a further object of the present invention to provide a method of performing a filtering operation utilizing a comb filter having no effect on a low frequency gain even when a learning time thereof is shortened, to enable a high performance of a servo control system.

It is still another object of the present invention to provide a method of performing a filtering operation by frequency-dividing a plurality of FG pulses and using the frequency-divided FG pulses, to enable a high performance of a servo control system.

In accordance with one aspect of the present invention, there is provided a comb filter comprising first switching means for switching sequentially a plurality of speed error data generated whenever a drum is rotated once, each of said speed error data corresponding to each polarization of said drum; a plurality of low pass filtering means for receiving the respective speed error data from said first switching means and low pass filtering the received data; second switching means for switching sequentially output data from said low pass filtering means; subtraction means for receiving the speed error data directly and the output data from said low pass filtering means through said second switching means to obtain respective differences therebetween; average value detection means for taking an average value of respective average values of the speed error data obtained by said low pass filtering means; and addition means for adding output data from said subtraction means to output data from said average value detection means.

In accordance with another aspect of the present invention, there is provided a rotation control apparatus comprising rotation detection means for detecting a plurality of FG pulses generated whenever a drum is rotated once, each of the FG pulses corresponding to each polarization of said drum; rotation speed error detection means for detecting a plurality of speed error data in response to the FG pulses detected by said rotation detection means; comb filtering means for cutting off a specified frequency and multiples thereof in response to the speed error data from said rotation speed error detection means; PG detection means for detecting a PG pulse generated whenever the drum is rotated once; phase error detection means for detecting a phase error in response to the PG pulse from said PG detection means and an external vertical synchronous signal; differentiation means for converting output data from said comb filtering means into angular acceleration error data; integration means for integrating output data from said phase error detection means; first multiplication means for multiplying output data from said differentiation means by a first multiplication factor; second multiplication means for multiplying the output data from said comb filtering means by a second multiplication factor; third multiplication means for multiplying the output data from said phase error detection means by a third multiplication factor; fourth multiplication means for multiplying output data from said integration means by a fourth multiplication factor; addition means for adding output data from said first and second multiplication means and adding output data from said third and fourth multiplication means; digital/analog conversion means for convening output data from said addition means into an analog signal; and motor driving means for driving a motor in response to an output signal front said digital/analog conversion means.

In accordance with a further aspect of the present invention, there is provided a rotation control apparatus comprising rotation detection means for detecting a plurality of FG pulses generated whenever a drum is rotated once, each of the FG pulses corresponding to each polarization of said drum; rotation speed error detection means for detecting a plurality of speed error data in response to the FG pulses detected by said rotation detection means; first comb filtering means for cutting off a specified frequency and multiples thereof in response to the speed error data from said rotation speed error detection means; PG detection means for detecting a PG pulse generated whenever the drum is rotated once; phase error detection means for detecting a phase error in response to the PG pulse from said PG detection means and an external vertical synchronous signal, said phase error detection means including a control signal generator for wave-shaping the PG pulse from said PG detection means, a phase reference signal generator for generating a phase reference signal and maximum and minimum error data output control signals in response to the wave-shaped PG pulse from said control signal generator and the external vertical synchronous signal and a phase error counter for detecting the phase error every FG pulse in response to the phase reference signal and the maximum and minimum error data output control signals from said phase reference signal generator; second comb filtering means for cutting off the specified frequency and the multiples thereof in response to a plurality of phase error data from said phase error detection means; differentiation means for converting output data from said first comb filtering means into angular acceleration error data; integration means for integrating output data from said second comb filtering means; first multiplication means for multiplying output data from said differentiation means by a first multiplication factor; second multiplication means for multiplying the output data from said first comb filtering means by a second multiplication factor; third multiplication means for multiplying the output data from said second comb filtering means by a third multiplication factor; fourth multiplication means for multiplying output data from said integration means by a fourth multiplication factor; addition means for adding output data from said first and second multiplication means and adding output data from said third and fourth multiplication means; digital/analog conversion means for convening output data from said addition means into an analog signal; and motor driving means for driving a motor in response to an output signal from said digital/analog conversion means.

In accordance with still another aspect of the present invention, there is provided a method of performing a filtering operation utilizing a comb filter, comprising the steps of (a) switching sequentially a plurality of speed error data generated whenever a drum is rotated once, each of the speed error data corresponding to each polarization of said drum; (b) obtaining respective average values of the sequentially switched speed error data, multiplying the obtained average values by a multiplication factor and correcting down a decimal point of each of the resultant values to generate a plurality of low pass filtered values; (c) switching sequentially the low pass filtered values; (d) obtaining respective differences between the speed error data and the sequentially switched low pass filtered values; (e) obtaining an average value of the respective average values obtained at said step (b); and (f) adding the average value obtained at said step (e) to the respective differences obtained at said step (d).

BRIEF DESCRIPTION OF THE DRAWINGS

The above and other objects, features and advantages of the present invention will be more clearly understood from the following detailed description taken in conjunction with the accompanying drawings, in which:

FIGS. 2A and 2B are waveform diagrams illustrating a conventional manner in which speed error data are detected;

FIGS. 3A to 3D are waveform diagrams of signals from components in a conventional digital comb filter in FIG. 1;

FIGS. 10A to 10J are waveform diagrams of signals from components in the digital comb filter in FIG. 7;

FIGS. 15A to 15F are timing diagrams illustrating a phase detection operation based on the speed control operation of FIG. 14.

DETAILED DESCRIPTION OF THE PREFERRED EMBODIMENTS

Figure 4:
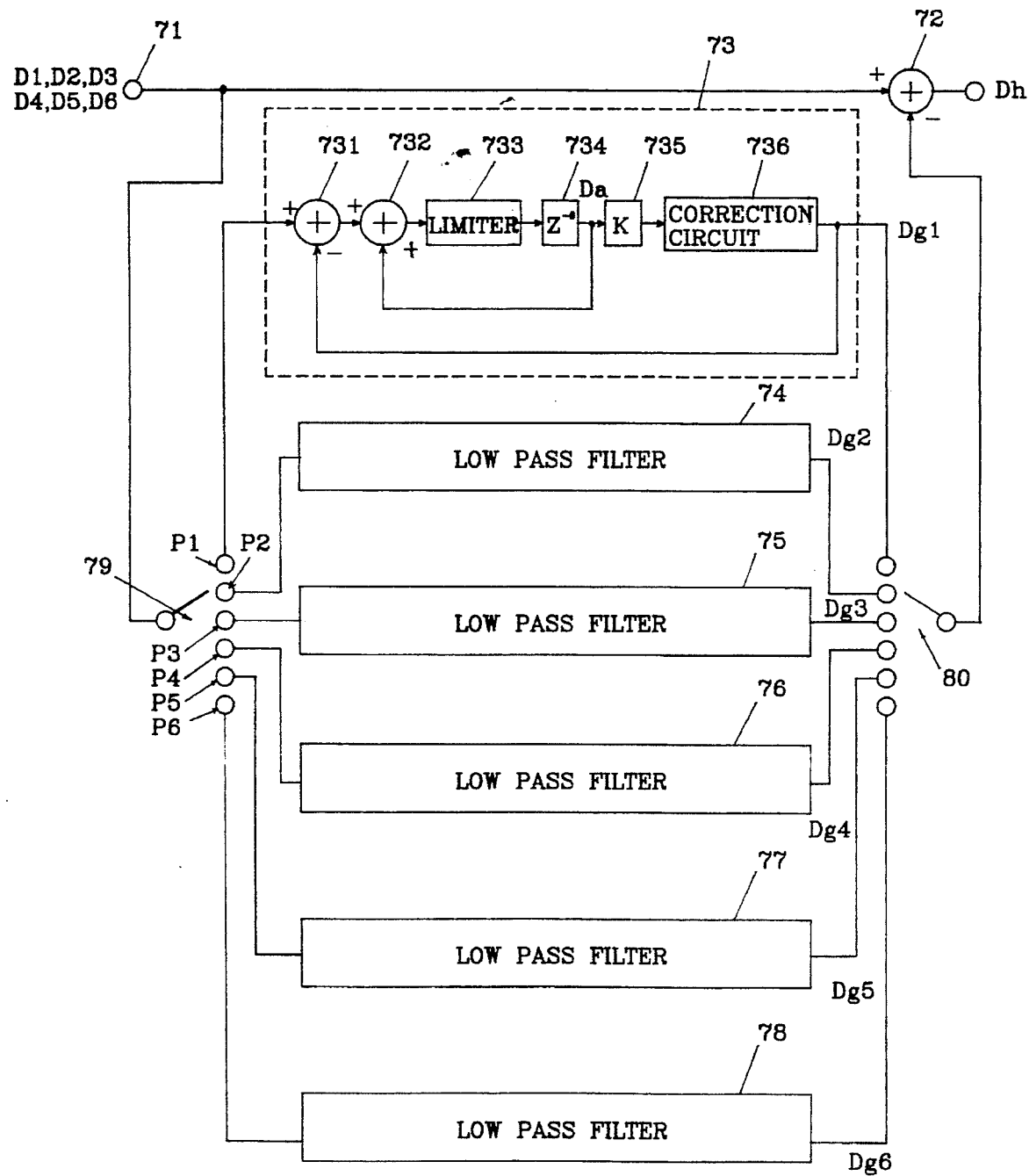
FIG. 4 is a block diagram of the digital comb filter in FIG. 1.
Figure 5:
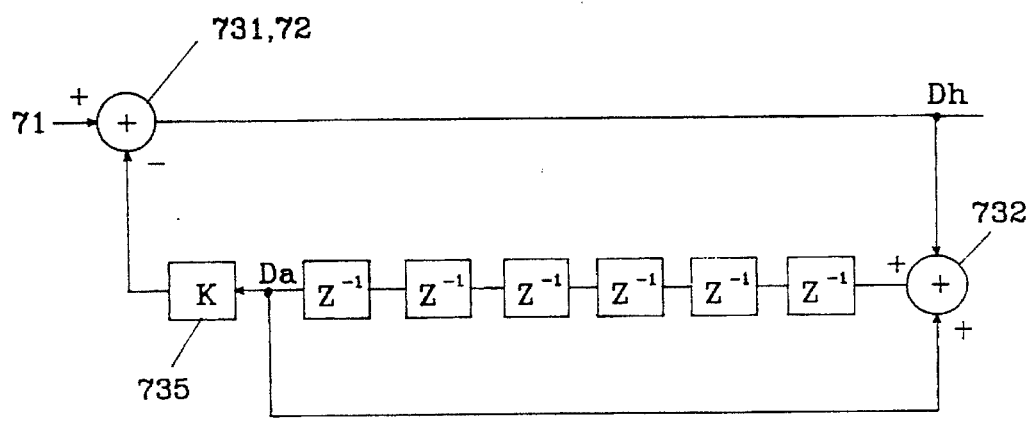
FIG. 5 is a block diagram illustrating an equivalent circuit of the digital comb filter of FIG. 4 in a digital domain.
Figure 6:
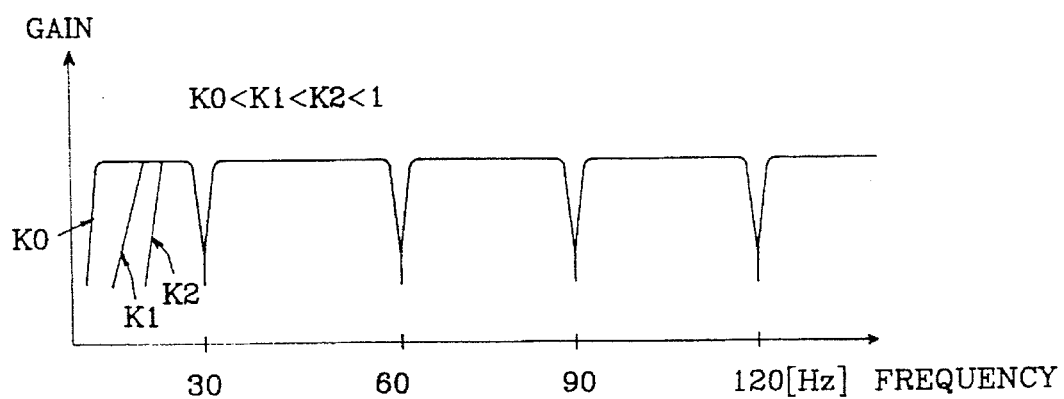
FIG. 6 is a waveform diagram illustrating a frequency characteristic of the digital comb filter in FIG. 4.
Figure 7:
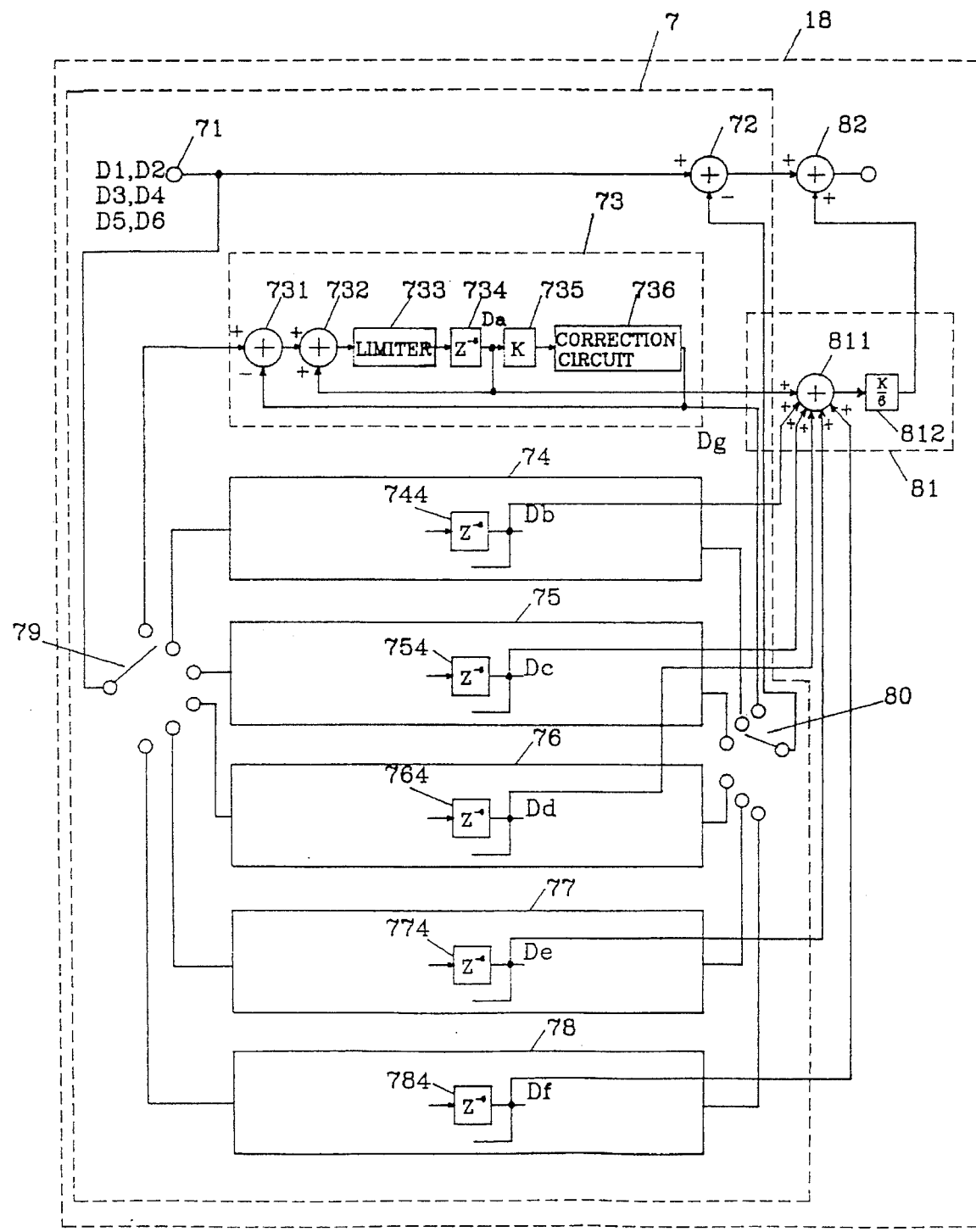
FIG. 7 is a block diagram of an embodiment of a digital comb filter in accordance with the present invention.

Referring to FIG. 7, there is shown a block diagram of an embodiment of a digital comb filter in accordance with the present invention. In this drawing, some of parts are the same as those in FIG. 4. Therefore, like reference numerals designate like pans. Here, the digital comb filter of the present invention is designated by the reference numeral 18. The digital comb filter 18 of the present invention is substantially the same in construction as the conventional digital comb filter 7, with the exception that it further comprises an average value detector 81, and an adder 82. The average value detector 81 is adapted to take an average value of the average values Da–Df from the delays 734, 744, 754, 764, 774 and 784 in the low pass filters 73–78. The adder 82 is adapted to add output data from the average value detector 81 to output data from the subtracter 72. Noticeably, the present invention has been made on the basis of the fact that a reduced mount in the low frequency gain of the conventional digital comb filter 7 is the same as the average value of the average values Da–Df.

The average value detector 81 includes an adder 811 for adding the average values Da–Df from the delays 734, 744, 754, 764, 774 and 784 in the low pass filters 73–78 and a multiplier 812 for dividing an output of the adder 811 by 6 (the number of the low pass filters 73–78) and multiplying the result by the multiplication factor K of the multiplier 735.

Figure 8:
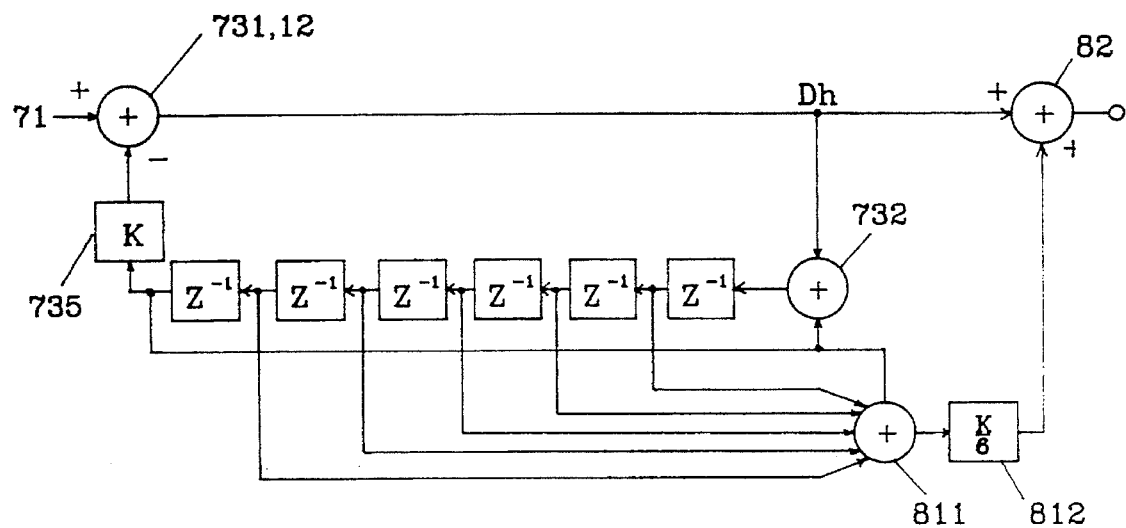
FIG. 8 is a block diagram illustrating an equivalent circuit of the digital comb filter of FIG. 7 in a digital domain.

Referring to FIG. 8, there is shown a block diagram illustrating an equivalent circuit of the digital comb filter 18 of FIG. 7 in a digital domain. As shown in this drawing, each of the subtracters 731 and 72 calculates respective differences between the speed error data D1–D6 fed through the input terminal 71 thereto and the output data from the multiplier 735 and applies the resultant data Dh to the adder 732. The output data from the adder 732 is sequentially delayed by the six delays $Z^{-1}$, multiplied by the multiplication factor K by the multiplier 735 and then transferred to the subtracters 731 and 72. The data Da delayed by the six delays $Z^{-1}$ is also fed back to the adder 732. The respective outputs from the six delays $Z^{-1}$ are added by the adder 811 and then applied to the multiplier 812, which divides the output data from the adder 811 by 6 (the number of the delays) and multiplies t e result by the multiplication factor K of the multiplier 735. Then, the output data from the multiplier 812 is applied to the adder 82. As a result, a transfer function T2 of the digital comb filter 18 can be obtained by the following equation (2):

$$T2=\{(1-Z^{-6})+K(Z^{-1}+Z^{-2}+Z^{-3}+Z^{-4}+Z^{-5}+Z^{-6})/6\}/\{1-(1-K)Z^{-6}\} \quad (2)$$

Figure 9:
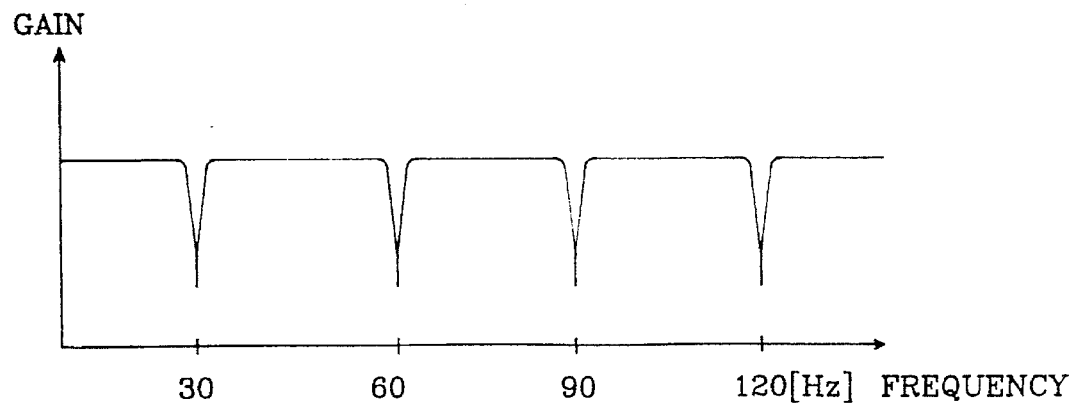
FIG. 9 is a waveform diagram illustrating a frequency characteristic of the digital comb filter in FIG. 7.

FIG. 9 is a waveform diagram illustrating a frequency characteristic of the transfer function T2 of the digital comb filter 18. As shown in this drawing, the transfer function T2 of the digital comb filter 18 has the frequency characteristic with the gain significantly improved at a low frequency domain.

FIGS. 10A to 10J are waveform diagrams of the signals from the components in the digital comb filter 18 in FIG. 7. Two origins φ and φ' are shown in these drawings. The former represents a normal state and the latter is shifted from the normal origin φ by a constant error or gap (φ–φ'). The shifted origin c b means that a DC component is present in the input to the digital comb filter 18.

The operation of the embodiment of the digital comb filter 18 with the abovementioned construction in accordance with the present invention will hereinafter be described in detail with reference to FIG. 7 and FIGS. 10A to 10J.

In the case of the normal origin φ, the output data Da–Df from the delays 734–784 which are the respective average values of the speed error data D1–D6 are provided as shown in FIGS. 10B to 10G. In this case, the subtracter 72 calculates the respective differences between the output data Dg1–Dg6 from the low pass filters 73–78 fed through the switch 80 thereto and the speed error data fed through the input terminal 71 thereto and outputs the calculated results as shown in FIG. 10H to the adder 82.

The output data Da–Df from the delays 734–784 are added by the adder 811, multiplied by K/6 by the multiplier 812 and then applied to the adder 82. At this time, the output data from the multiplier 812 is applied to the adder 82 as shown in FIG. 10I.

The adder 82 adds the output data from the subtracter 72 to the output data from the multiplier 812 and outputs the resultant data as shown in FIG. 10J.

In the case of the shifted origin φ' or the presence of the DC bias component in the input to the digital comb filter 18, the operation is performed by up to the subtracter 72 in the same manner as that in the normal origin φ or the presence of no DC bias component in the input to the digital comb filter 18. Namely, the output data from the subtracter 72 is the same as that in the prior art as shown in FIG. 10H.

The output data from the subtracter 72 contains no DC component, while the output data from the average value detector 81 which is the average value of the outputs from the delays 734–784 contains the DC component. The output data from the subtracter 72 and the output data from the average value detector 81 are added by the adder 82. This addition has the effect of preventing the DC component from being removed. As a result, the digital comb filter 18 can be disposed between the speed error counter 42 and the common connection point of the differentiator 5 and the multiplier 9 with no problem, as will be mentioned later with reference to FIG. 11.

Figure 1:
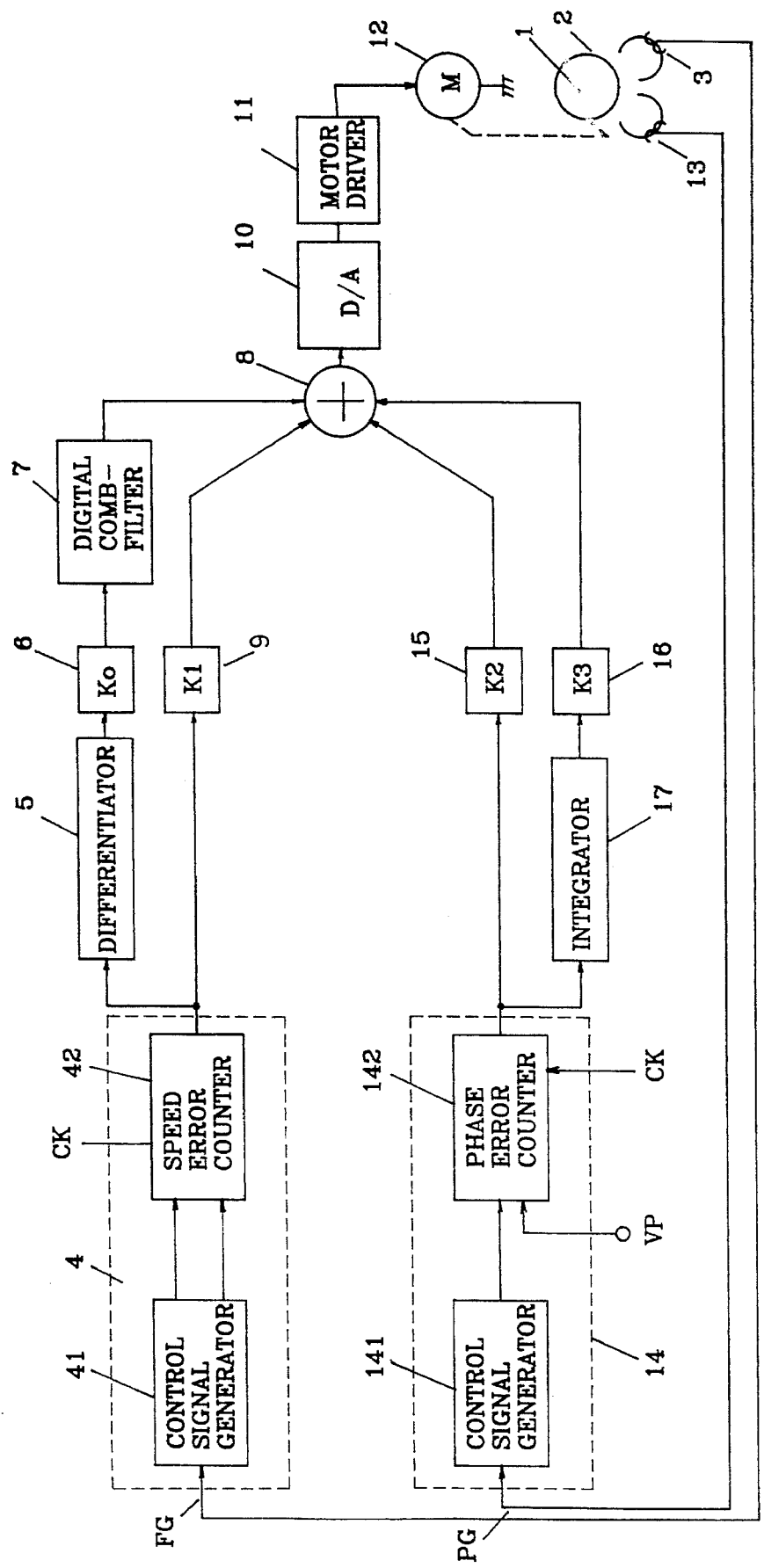
FIG. 1 is a block diagram of a conventional rotation control apparatus.
Figure 11:
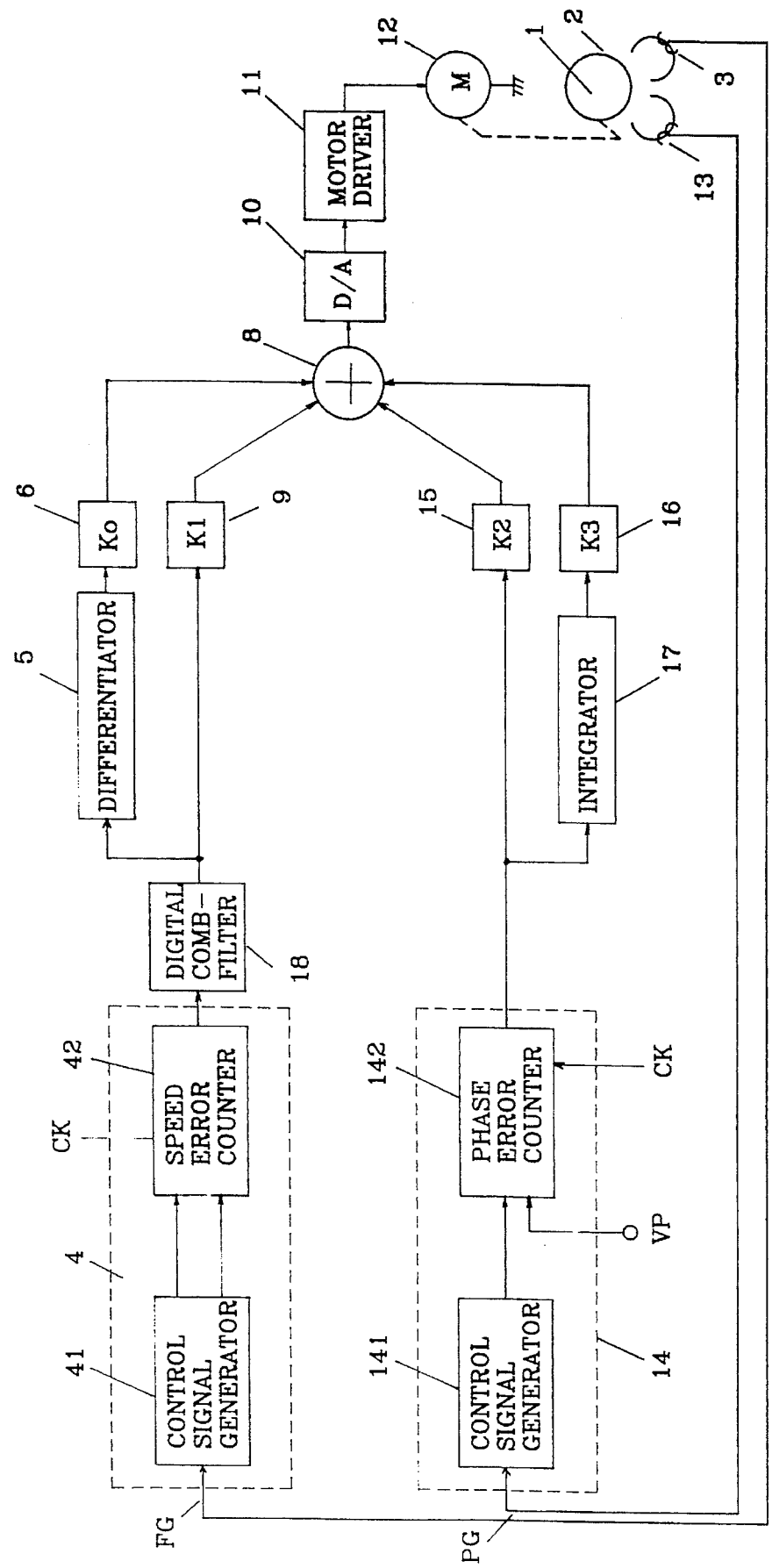
FIG. 11 is a block diagram of an embodiment of a rotation control apparatus employing the digital comb filter in FIG. 7 in accordance with the present invention.

Referring to FIG. 11, there is shown a block diagram of an embodiment of a rotation control apparatus employing the digital comb filter 18 in FIG. 7 in accordance with the present invention. The construction of this drawing is substantially the same as that of FIG. 1, with the exception that the digital comb filter 18 is disposed between the speed error counter 42 and the common connection point of the differentiator 5 and the multiplier 9. Therefore, the description will be omitted.

Figure 12:
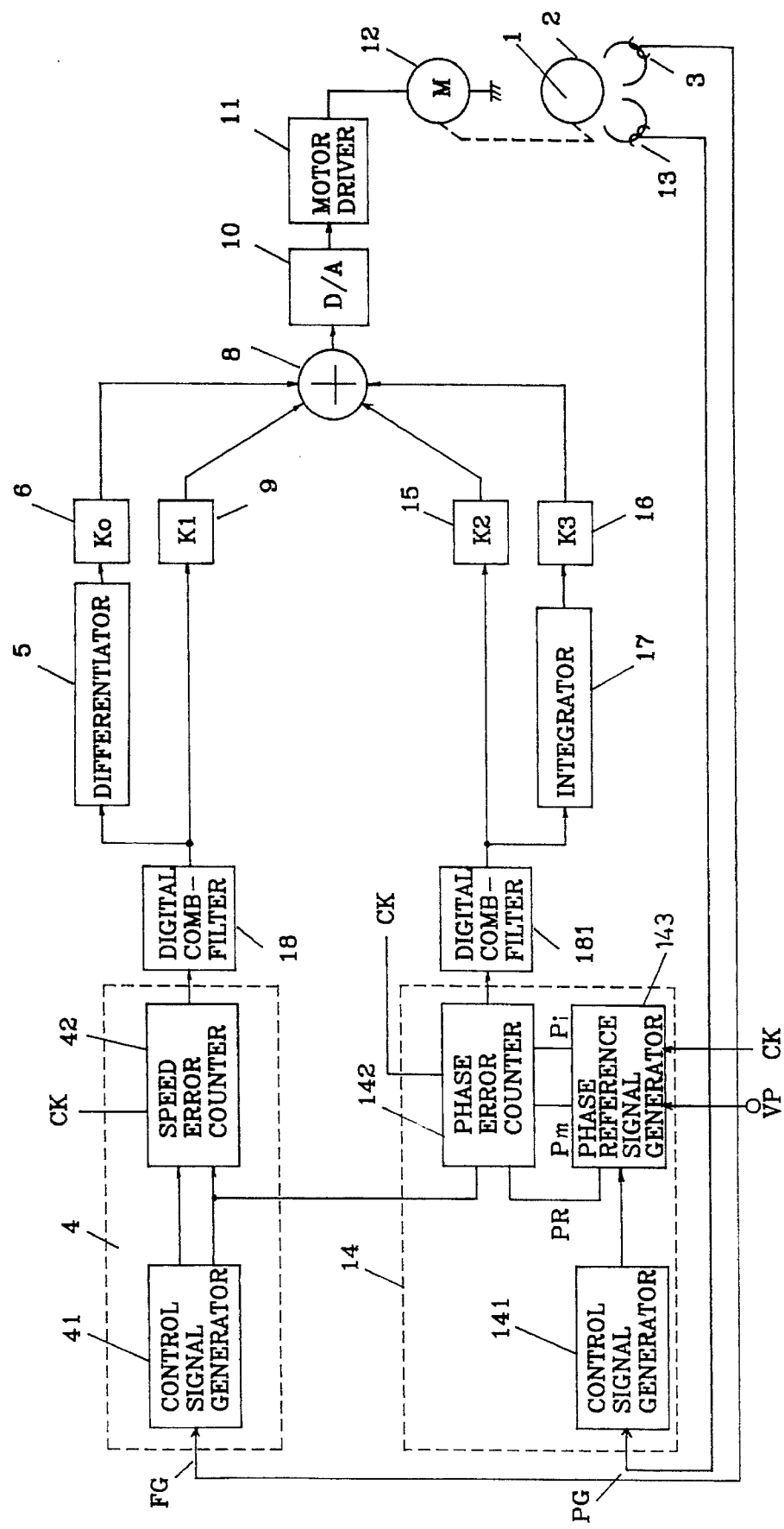
FIG. 12 is a block diagram of an alternative embodiment of the rotation control apparatus employing the digital comb filter in FIG. 7 in accordance with the present invention.

Referring to FIG. 12, there is shown a block diagram of an alternative embodiment of the rotation control apparatus employing the digital comb filter 18 in FIG. 7 in accordance with the present invention. The construction of this drawing is substantially the same as that of FIG. 11, wit h the exception that a digital comb filter 181 and a phase reference signal generator 143 are further provided. The digital comb filter 181 is disposed between a common connection point of the inputs of the integrator 17 and the multiplier 15 and the output of the phase error detection circuit 14. The phase reference signal generator 143 is disposed between the output of the control signal generator 141 and the input of the phase error counter 141. The digital comb filter 181 is the same in construction as the comb filter 18.

The operation of the alternative embodiment of the rotation control apparatus with the above-mentioned construction in accordance with the present invention will hereinafter be described in detail, particularly in terms of a phase control system, with reference to FIGS. 13A to 13H, which are waveform diagrams of the signals from the components in FIG. 12.

Figure 13:
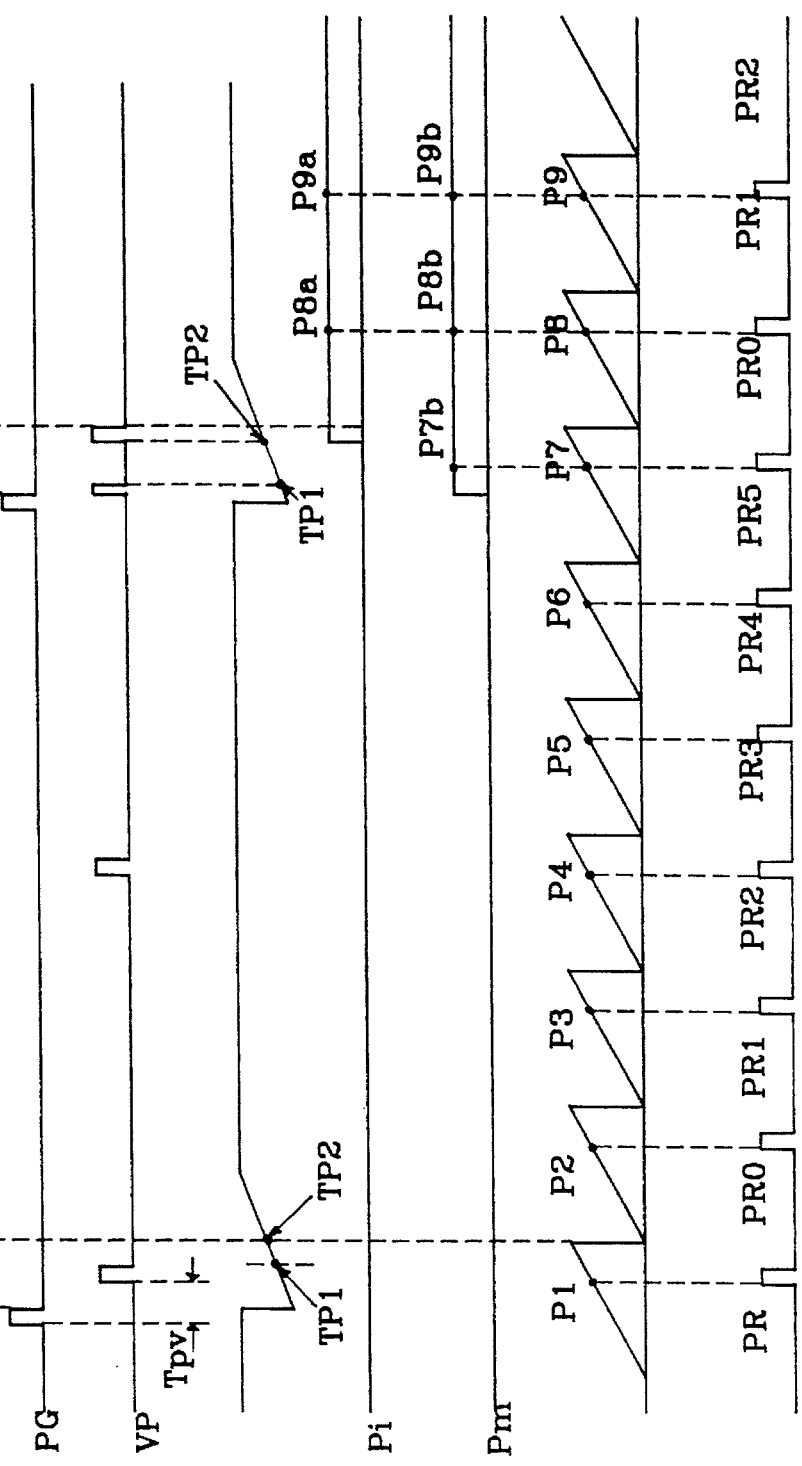
FIGS. 13A to 13H are waveform diagrams of signals from components in the rotation control apparatus of FIG. 12.

The PG detector 13 detects the PG pulse as shown in FIG. 13B generated whenever the drum 1 is rotated once with the rotation of the motor 12. The control signal generator 141 wave-shapes the detected PG pulse from the PG detector 13 as shown in FIG. 13B and outputs the resultant signal to the phase reference signal generator 143.

In response to the wave-shaped PG pulse from the control signal generator 141 and the vertical synchronous signal Vp of the video signal, the phase reference signal generator 143 generates a phase reference signal PR to latch the phase error counter 142 and outputs the generated phase reference signal PR to the phase error counter 142. Also, the phase reference signal generator 143 measures the timing of the PG pulse and the vertical synchronous signal, generates maximum and minimum error data output control signals Pm and Pi as shown in FIGS. 13E and 13F in accordance with the measured result and outputs the generated maximum and minimum error data output control signals Pm and Pi to the phase error counter 142.

Namely, upon receiving the PG pulse from the control signal generator 141, the phase reference signal generator 143 resets its internal phase region measurement counter (not shown) and then increments a count thereof in response to an external clock pulse CK, as shown in FIG. 13D. Upon receiving the vertical synchronous signal Vp, the phase reference signal generator 143 latches the count of the phase region measurement counter together with the phase reference signal PRO as shown in FIG. 13H.

If the count of the phase region measurement counter is present between reference values TP1 and TP2 as shown in FIG. 13D, the maximum and minimum error data output control signals Pm and Pi are 0 as shown in FIGS. 13E and 13F. If the latched count of the phase region measurement counter exceeds the reference value TP2, the minimum error data output control signal Pi is generated. If the latched count of the phase region measurement counter is smaller than the reference value TP1, the maximum error data output control signal Pm is generated. In the case where the latched count of the phase region measurement counter is present between the reference values TP1 and TP2, the phase control is performed every FG pulse as shown in FIG. 13A.

If the minimum error data output control signal Pi is high, the phase error counter 142 does not output a count P8 as shown in FIG. 13G but a minimum count P8a, in response to the phase reference signal PR. If the maximum error data output control signal Pm is high, the phase error counter 142 does not output the count P8 as shown in FIG. 13G but a maximum count P8b, in response to the phase reference signal PR.

In the case where both the maximum and minimum error data output control signals Pm and Pi are 0, the phase error counter 142 outputs counts P1, P2, ... as detected phase values DP.

The detected phase values DP are applied through the comb filter 181 to the multiplier 15, which multiplies the detected phase values DP by the multiplication factor K2. Also, the detected phase values DP passed through the comb filter 181 are integrated by the integrator 17 and then multiplied by the multiplication factor K3 by the multiplier 16. The adder 8 adds the outputs of the multipliers 15 and 16 and the outputs of the multipliers 6 and 9. The output of the adder 8 is converted into the analog signal by the D/A converter 10 and then applied to the motor driver 11. As a result, the motor driver 11 can control the rotation speed and the phase of the motor 12.

The increase in the operation time and the reduction in the gain margin resulting from the large number of polarizations can be solved by calculating the average value on the basis of the previous value utilizing the fact that the $Z^{-1}$ term is present in the transfer function of the comb filter 18 of the present invention. As an example, a description will hereinafter be made with respect to the case where the number of the polarizations is greater than 6. In this case, the frequency-divided FG pulses will be used.

Figure 14:
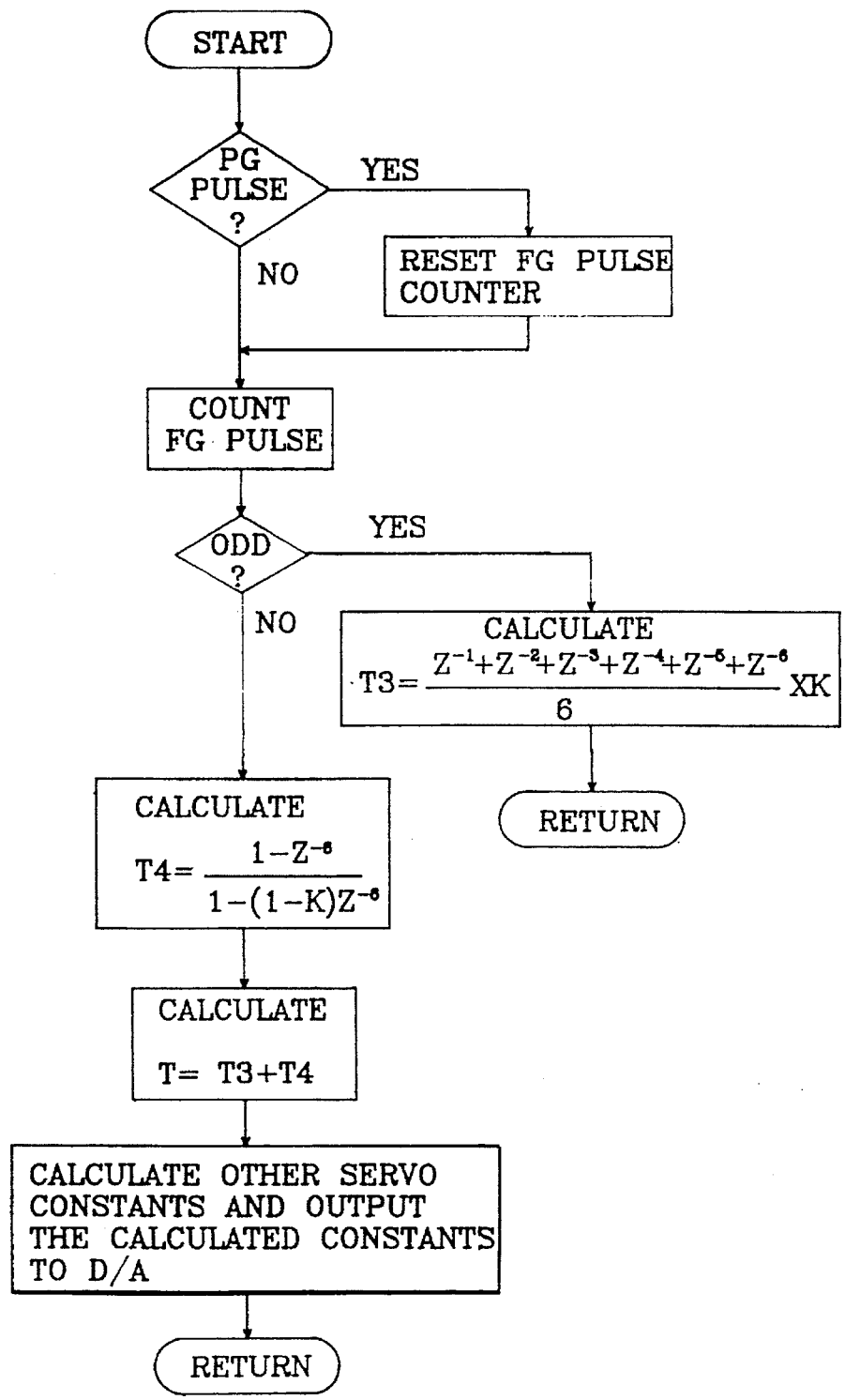
FIG. 14 is a flowchart illustrating a speed control operation in the case of twelve FG pulses in accordance with the present invention.

FIG. 14 is a flowchart illustrating a speed control operation in the case of twelve FG pulses in accordance with the present invention and FIGS. 15A to 15F are timing diagrams illustrating a phase detection operation based on the speed control operation of FIG. 14. On the assumption that the PG detector 13 detects one PG pulse as shown in FIG. 15B and the rotation detector 3 detects twelve FG pulses as shown in FIG. 15A whenever the motor 12 is rotated once, the control operation of the comb filter 18 will hereinafter be described in detail.

First, in the step of frequency-dividing the FG pulses, it is checked whether the input data is the PG pulse. If it is checked that the input data is the PG pulse, the FG pulse counter is reset and the FG pulses are then counted. If it is checked that the input data is not the PG pulse, the FG pulses are directly counted as shown in FIG. 15D. It is then checked whether the FG pulse count is an odd number. If it is checked that the FG pulse count is the odd number, the following equation (3) is calculated in timing as shown in FIG. 15E:

$$T3=(Z^{-1}+Z^{-2}+Z^{-3}+Z^{-4}+Z^{-5}+Z^{-6})\times K/6 \quad (3)$$

If it is checked that the FG pulse count is an even number, the following equation (4) is calculated in timing as shown in FIG. 15F and the calculated result is then added to T3:

$$T4=(1-Z^{-6})/\{1-(1-K)Z^{-6}\} \quad (4)$$

Other servo constants are calculated and the calculated results are applied to the D/A converter 10. Then, the operation is returned.

As apparent from the above description, according to the present invention, the relation between the low frequency gain and the learning time is enhanced. Namely, the comb filter has no effect on the low frequency gain even when the learning time thereof is shortened, and is thus applicable to the phase control system. Also, according to the present invention, there are provided the rotation control apparatus employing such a comb filter and the method of performing the filtering operation utilizing such a comb filter. Therefore, a high performance of the servo control system is enabled in controlling the speed and phase.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotation control apparatus comprising:

rotation detection means for detecting a plurality of FG pulses generated whenever a drum is rotated once, each of the FG pulses corresponding to each polarization of said drum;

rotation speed error detection means for detecting a plurality of speed error data in response to the FG pulses detected by said rotation detection means;

comb filtering means for cutting off a specified frequency and multiples thereof in response to the speed error data from said rotation speed error detection means;

PG detection means for detecting a PG pulse generated whenever the drum is rotated once;

phase error detection means for detecting a phase error in response to the PG pulse from said PG detection means and an external vertical synchronous signal;

differentiation means for converting output data from said comb filmring means into angular acceleration error data;

integration means for integrating output data from said phase error detection means;

first multiplication means for multiplying output data from said differentiation means by a first multiplication factor;

second multiplication means for multiplying the output data from said comb filtering means by a second multiplication factor;

third multiplication means for multiplying the output data from said phase error detection means by a third multiplication factor;

fourth multiplication means for multiplying output data from said integration means by a fourth multiplication factor;

addition means for adding output data from said first and second multiplication means and adding output data from said third and fourth multiplication means;

digital/analog conversion means for converting output data from said addition means into an analog signal; and motor driving means for driving a motor in response to an output signal from said digital/analog conversion means.

2. A rotation control apparatus as set forth in claim 1, wherein said comb filtering means includes:

a first switch for switching sequentially the speed error data from said rotation speed error detection means;

a plurality of low pass filters for receiving the respective speed error data from said first switch and low pass filtering the received data;

a second switch for switching sequentially output data from said low pass filters;

a subtracter for receiving the speed error data from said rotation speed error detection means directly and The output data from said low pass filters through said second switch to obtain respective differences therebetween;

average value detection means for taking an average value of respective average values of the speed error data obtained by said low pass filters; and a first adder for adding output data from said subtracter to output data from said average value detection means.

3. A rotation control apparatus as set forth in claim 2, wherein said average value detection means includes:

a second adder for adding the respective average values of the speed error data obtained by said low pass filters; and a multiplier for dividing an output of said second adder by the number of said speed error data and multiplying the result by a fifth multiplication factor.

4. A rotation control apparatus as set forth in claim 3, wherein the fifth multiplication factor of said multiplier is the same as those of respective multipliers of said low pass filters.

5. A rotation control apparatus comprising:

rotation detection means for detecting a plurality of FG pulses generated whenever a drum is rotated once, each of the FG pulses corresponding to each polarization of said drum;

rotation speed error detection means for detecting a plurality of speed error data in response to the FG pulses detected by said rotation detection means;

first comb filtering means for cutting off a specified frequency and multiples thereof in response to the speed error data from said rotation speed error detection means;

PG detection means for detecting a PG pulse generated whenever the drum is rotated once;

phase error detection means for detecting a phase error in response to the PG pulse from said PG detection means and an external vertical synchronous signal, said phase error detection means including a control signal generator for wave-shaping the PG pulse from said PG detection means, a phase reference signal generator for generating a phase reference signal and maximum and minimum error data output control signals in response to the wave-shaped PG pulse from said control signal generator and the external vertical synchronous signal and a phase error counter for detecting the phase error every FG pulse in response to the phase reference signal and the maximum and minimum error data output control signals from said phase reference signal generator;

second comb filtering means for cutting off the specified frequency and the multiples thereof in response to a plurality of phase error data from said phase error detection means;

differentiation means for converting output data from said first comb filtering means into angular acceleration error data;

integration means for integrating output data from said second comb filtering means;

first multiplication means for multiplying output data from said differentiation means by a first multiplication factor;

second multiplication means for multiplying the output data from said first comb filtering means by a second multiplication factor;

third multiplication means for multiplying the output data from said second comb filtering means by a third multiplication factor;

fourth multiplication means for multiplying output data from said integration means by a fourth multiplication factor;

addition means for adding output data from said first and second multiplication means and adding output data from said third and fourth multiplication means;

digital/analog conversion means for converting output data from said addition means into an analog signal; and motor driving means for driving a motor m response to an output signal from said digital/analog conversion means.

6. A rotation control apparatus as set forth in claim 5, wherein each of said first and second comb filtering means includes:

a first switch for switching sequentially the speed error data from said rotation speed error detection means;

a plurality of low pass filters for receiving the respective speed error data from said first switch and low pass filtering the received data;

a second switch for switching sequentially output data from said low pass filters;

a subtracter for receiving the speed error data from said rotation speed error detection means directly and the output data from said low pass filters through said second switch to obtain respective differences therebetween;

average value detection means for taking an average value of respective average values of the speed error data obtained by said low pass filters; and a first adder for adding output data from said subtracter to output data from said average value detection means.

7. A rotation control apparatus as set forth in claim 6, wherein said average value detection means includes:

a second adder for adding the respective average values of the speed error data obtained by said low pass filters; and a multiplier for dividing an output of said second adder by the number of said speed error data and multiplying the result by a fifth multiplication factor.

8. A rotation control apparatus as set forth in claim 7, wherein the fifth multiplication factor of said multiplier is the same as those of respective multipliers of said low pass filters.

* * * * *